United States Patent
Chu et al.

(10) Patent No.: US 10,083,101 B2
(45) Date of Patent: Sep. 25, 2018

(54) COMPUTER STATUS DIAGNOSIS CHIP AND COMPUTER STATUS DIAGNOSIS SYSTEM INCLUDING THE SAME

(71) Applicant: Nuvoton Technology Corporation, Hsinchu (TW)

(72) Inventors: Ping-Ying Chu, Hsinchu (TW); Chia-Ching Lu, Hsinchu (TW); Ming-Che Hung, Xinpu Township, Hsinchu County (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 237 days.

(21) Appl. No.: 15/157,902

(22) Filed: May 18, 2016

(65) Prior Publication Data
US 2017/0123878 A1    May 4, 2017

(30) Foreign Application Priority Data
Nov. 4, 2015 (TW) .............................. 104136276 A (51) Int. Cl.
*G06F 11/00*    (2006.01)
*G06F 11/22*    (2006.01)
(Continued)

(52) U.S. Cl.
CPC ...... *G06F 11/2284* (2013.01); *G06F 11/0736* (2013.01); *G06F 11/0772* (2013.01);
(Continued)

(58) Field of Classification Search
CPC ............. G06F 11/0766; G06F 11/0772; G06F 11/0784; G06F 11/2284; G06F 2011/2278;
(Continued)

(56) References Cited

U.S. PATENT DOCUMENTS 5,875,293 A * 2/1999 Bell .................. G06F 11/22
714/27
6,052,800 A * 4/2000 Gentile ............... G06F 11/2284
713/2
(Continued)

FOREIGN PATENT DOCUMENTS

| CN | 100407160 C | 7/2008 |
|---|---|---|
| CN | 103364655 A | 10/2013 |
| TW | 201316251 A | 4/2013 |

*Primary Examiner* — Gabriel Chu
(74) *Attorney, Agent, or Firm* — Muncy, Geissler, Olds & Lowe, P.C.

(57) ABSTRACT

A computer status diagnosis chip and a computer status diagnosis system including the same are provided. The chip is connected with the computer chip set and the first audio generator, and includes a receiving unit, an audio encoder and a driving unit. The receiving unit receives a detection signal from the computer chip set, and the audio encoder is connected to the receiving unit and encodes the detection signal as a first audio signal. The driving unit drives the first audio generator according to the first audio signal. By acoustic wave, the first audio generator transmits the first audio signal to a first audio receiver. Upon receipt of the first audio signal, an application program installed in the smart device is used to decode the first audio signal to obtain the detection signal, and a computer status is displayed on the smart device.

14 Claims, 8 Drawing Sheets

(51) Int. Cl.
G06F 11/32 (2006.01)
G06F 11/07 (2006.01)
G10L 19/018 (2013.01)
G06F 11/30 (2006.01)

(52) U.S. Cl.
CPC .......... G06F 11/321 (2013.01); G06F 11/327 (2013.01); G06F 11/328 (2013.01); G10L 19/018 (2013.01); *G06F 11/3031* (2013.01); *G06F 11/3058* (2013.01)

(58) Field of Classification Search
CPC .. G06F 11/3031; G06F 11/3058; G06F 11/32; G06F 11/321; G06F 11/324; G06F 11/327; G06F 11/328
See application file for complete search history.

(56) References Cited

U.S. PATENT DOCUMENTS

| | | | | |
|---|---|---|---|---|
| 6,654,816 | B1 * | 11/2003 | Zaudtke | G06F 11/0709 340/571 |
| 6,807,629 | B1 * | 10/2004 | Billick | G06F 13/387 710/62 |
| 2002/0144191 | A1 * | 10/2002 | Lin | G06F 11/326 714/46 |
| 2002/0166084 | A1 * | 11/2002 | Raynham | G06F 11/0709 714/37 |
| 2005/0157886 | A1 * | 7/2005 | Morrell | G06F 11/0772 381/58 |
| 2005/0172038 | A1 * | 8/2005 | Biggs | G06F 11/2289 710/1 |
| 2005/0240818 | A1 * | 10/2005 | James, Jr. | G06F 11/22 714/27 |
| 2005/0240825 | A1 * | 10/2005 | El-Batal | G06F 11/2221 714/42 |
| 2006/0136544 | A1 * | 6/2006 | Atsmon | A63H 3/28 709/200 |
| 2008/0294939 | A1 * | 11/2008 | Kong | G06F 11/273 714/37 |
| 2009/0279389 | A1 * | 11/2009 | Irie | G01S 7/003 367/118 |
| 2013/0159789 | A1 * | 6/2013 | Wang | G06F 11/0751 714/48 |
| 2013/0166969 | A1 * | 6/2013 | Zhang | G06F 11/0772 714/57 |

\* cited by examiner

COMPUTER STATUS DIAGNOSIS CHIP AND COMPUTER STATUS DIAGNOSIS SYSTEM INCLUDING THE SAME

CROSS-REFERENCE TO RELATED APPLICATION

This application claims the benefit of Taiwan Patent Application No. 104136276, filed on Nov. 4, 2015, in the Taiwan Intellectual Property Office, the disclosure of which is incorporated herein in its entirety by reference.

BACKGROUND OF THE INVENTION

1. Field of the Invention

The present disclosure is related to a computer status diagnosis chip and a computer status diagnosis system, more particularly to a computer status diagnosis chip and a computer status diagnosis system capable of transmitting message by audio signal.

2. Description of the Related Art

In order to check whether components of a computer are normal functioning, a series of detection and diagnosis processes are performed while the computer is booted up, so as to provide a user a detection and diagnosis result, which is usually called as a system diagnostic message. According to the system diagnosis messages, the user can know whether the computer has error during boot-up, and the position and content about the occurred error. At the same time, the operation environment information of the computer can also be provided to the user for further trouble shooting. For example, the environment information includes current temperatures and working voltages of the components, and a fan speed.

In conventional technology, the system diagnosis message is usually shown to the user by direct display. For example, in a personal computer, Basic input/output System (BIOS) is most generally used to provide the system diagnosis message. While the computer is booted up, through the central processor (CPU) the BIOS accesses a series of instructions stored in firmware and executes power-on self-test (POST) process. A result of the POST is displayed on an output interface of the computer, for example, the result can be displayed on a computer monitor or shown by LED light of the computer. In addition, some BIOSs of different manufacturers can also notice the user about the computer diagnosis result by combination of different lengths of sound output by a buzzer during boot-up.

In addition, an extra detection or diagnosis chip disposed on a computer motherboard can also be used to provide system diagnosis message to the user, but the diagnosis result is directly displayed on the motherboard, so the user must open the housing of the computer to see the diagnosis result displayed by the chip. In addition, a plug-in computer status diagnosis product is commercially available in market to provide user to obtain the diagnosis result without opening the housing. The plug-in computer status diagnosis product is connected to an insertion slot (such as a USB port) exposed out of the housing, to electrically connect with the computer chip set, so as to diagnose the computer status and display the diagnosis result outside of the housing.

There is still much room to improve the conventional computer status diagnosis method. For example, under a condition that the monitor of the computer is used to display the diagnosis result, it fails to provide the diagnosis result to the user if failure of the monitor or display card of the computer occurs, or the computer system has error before the monitor is activated. Under a condition that the LED light or the buzzer is used to notice the user about the diagnosis result, only simple diagnosis result can be expressed completely. In addition, diagnosis product manufacturers usually develop different specifications for diagnosis, so the user usually needs to review the specification of the diagnosis product for understanding the status expressed by the light or sound when the LED light or the buzzer is used to express the diagnosis result. For example, for the same computer status, the combinations of various lengths of sound developed by the AMI BIOS, the Phoenix BIOS, and the IBM BIOS are different. The existing way of expressing the diagnosis result is not intuitional for the user.

Figure 1:
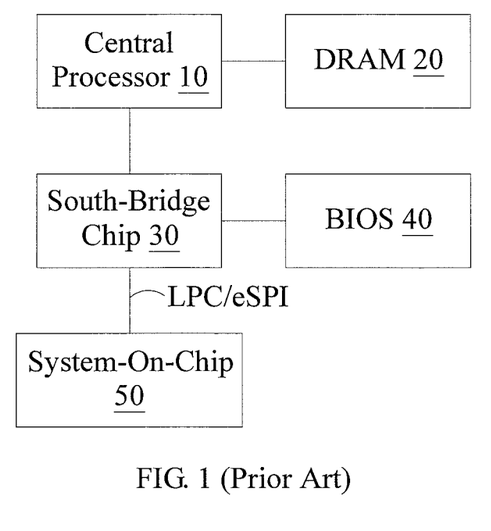
FIG. 1 is a block diagram of computer status diagnosis by BIOS in prior art.

On the other hand, while the BIOS or the plug-in computer status diagnosis product is used for diagnosis, it may fail to detect the computer status in an early stage because the at least one component of the computer involved in the diagnosis process is activated after the early stage. Refer to FIG. 1 which shows a block diagram of a conventional computer status diagnosis system by using BIOS. After a computer is booted up, the central processor 10 accesses data of BIOS 40 through a south-bridge chip 30 and stores the data in dynamic random-access memory (DRAM) 20, and then decompresses the data to execute instruction sets stored therein. In the instruction sets to be executed by the central processor 10, the first is POST instruction set for testing the computer statuses. However, when the any one of the components (such as the south-bridge chip 30, the central processor 10 and the DRAM 20) in above-described operation path has error, it fails to execute the predetermined test function in the BIOS 40. The user can only guess the probable problem of the computer but no more detail about the problem because of no response from the broken computer. Similarly, an external computer status diagnosis product is connected with the computer host through USB port, and the USB driving procedure is executed after the operating system of the computer host is activated, so the external computer status diagnosis product fails to report the detection result if the computer host has error occurred prior to running of the OS.

SUMMARY OF THE INVENTION

An objective of the present disclosure is to provide a computer status diagnosis chip and a computer status diagnosis system including the same, so as to detect the computer status in the early stage and provide the detection result to the user by a more intuitional way.

According to the objective of the present disclosure, a computer status diagnosis chip is provided. The computer status diagnosis chip is electrically connected with the computer chip set and the first audio generator and configured to display the computer status through the smart device. The computer status diagnosis chip includes a receiving unit, an audio encoder and a driving unit. A receiving unit is configured to receive a detection signal from the computer chip set. The audio encoder is connected to the receiving unit and configured to encode the detection signal into a first audio signal. The driving unit is configured to drive the first audio generator according to the first audio signal. The first audio generator is configured to transmit the first audio signal by acoustic wave to a first audio receiver connected with the smart device. After the smart device receives the first audio signal through the first audio receiver, the smart device decodes the first audio signal by an application program of the smart device to obtain the detection signal, and displays the computer status corresponding to the detection signal.

Preferably, the receiving unit is connected with the computer chip set through low pin count interface or enhanced serial peripheral interface, and after the computer status diagnosis chip and the computer chip set are supplied with power by the computer system, the computer status diagnosis chip starts to monitor the computer chip set before the computer chip set activates the BIOS.

Preferably, the computer status diagnosis chip further includes a timer connected with the receiving unit and the audio encoder. Under a condition that the computer status diagnosis chip and the computer chip set are supplied with power by the computer system, if the computer chip set does not transmit the detection signal to the computer status diagnosis chip after the timer counts for a predetermined period, the audio encoder generates the first audio signal indicative of a serious error message and the driving unit drives the first audio generator according to the first audio signal indicative of the serious error message. After the smart device receives the first audio signal through the first audio receiver, the smart device decodes the first audio signal and displays the computer status corresponding to the serious error message.

Preferably, after the computer chip set transmits an initial detection signal to the receiving unit, the timer is reset and re-counts every time the computer chip set transmits the detection signal to the receiving unit. Under a condition that the computer chip set transmits the initial detection signal to the receiving unit, if the computer chip set does not transmit next detection signal or an end message to the receiving unit after the timer re-counts for the predetermined period, the audio encoder generates the first audio signal indicative of a component error message corresponding to the next detection signal, and the driving unit drives the first audio generator according to the first audio signal indicative of the component error message. After the smart device receives the first audio signal through the first audio receiver, the smart device decodes the first audio signal and displays the computer status corresponding to the component error message.

Preferably, the receiving unit is further connected to a signal source which outputs an analog signal or a digital signal, the audio encoder encodes the analog signal or the digital signal into the first audio signal. The driving unit drives the first audio generator according to the first audio signal encoded based on the analog signal or the digital signal. After the smart device receives the first audio signal through the first audio receiver, the smart device decodes the first audio signal and displays a message related to the analog signal or the digital signal.

Preferably, the first audio signal, generated by the audio encoder, includes an ID section, a message type section and a message content section.

Preferably, the computer status diagnosis chip may further include a hardware monitoring unit connected to the receiving unit, and connected to a temperature measurement unit, a fan or a voltage measurement unit, and the hardware monitoring unit is configured to convert the received analog signal into the digital signal and then output the converted digital signal to the computer chip set.

Preferably, the receiving unit may further be connected to the second audio receiver, and the smart device may further be connected to the second audio generator. The smart device encodes a control instruction as a second audio signal, and drives the second audio generator according to the second audio signal, and the second audio generator transmits the second audio signal to the second audio receiver by acoustic wave. The receiving unit receives the second audio signal through the second audio receiver. The receiving unit decodes the second audio signal by the audio decoder to obtain the control instruction, and executes an action corresponding to the control instruction.

Preferably, the smart device may further be connected with a security unit. The smart device encodes the authentication signal from the security unit into the second audio signal. After confirmation for the authentication signal, the computer status diagnosis chip executes an action corresponding to the authentication signal.

Preferably, the frequency of the acoustic wave generated by the first audio generator according to the first audio signal is ranged between from 15 kHz to 20 kHz.

According to the objective of the present disclosure, a computer status diagnosis system is provided. The computer status diagnosis system includes a computer status diagnosis chip, a first audio generator, a smart device and a first audio receiver. The computer status diagnosis chip includes a receiving unit connected to the computer chip set, an audio encoder connected to the receiving unit, and a driving unit connected to the audio encoder. The first audio generator is connected to the driving unit, and the smart device is installed with an application program. The first audio receiver is connected with the smart device. The receiving unit receives a detection signal from the computer chip set, the audio encoder encodes the detection signal as a first audio signal, and the driving unit drives the first audio generator according to the first audio signal. The audio generator transmits the first audio signal to the first audio receiver by acoustic wave. After the smart device receives the first audio signal through the first audio receiver, the application program is used to decode the first audio signal to obtain the detection signal, and a computer status corresponding to the detection signal is displayed on the smart device.

In summary, in accordance with the present disclosure, the computer status diagnosis chip and the computer status diagnosis system including the same have at least one advantage described below.

First, the computer status diagnosis chip and the computer status diagnosis system including the same can encode the detection signal as an audio signal which is then transmitted to the smart device and decoded by the application program of the smart device, so that the user can directly obtain the computer status on the smart device.

Secondly, the computer status diagnosis chip is connected to the computer chip set through LPC or eSPI, so that the computer status can be monitored instantly after the computer is booted up to prevent information missing.

Thirdly, the computer status diagnosis chip and the computer status diagnosis system including the same can transmit signal by acoustic wave, so as to save power consumption.

Fourthly, the computer status diagnosis chip and the computer status diagnosis system including the same can receive and decode the audio signal from the smart device, so as to achieve the function of remotely operating the computer.

Fifthly, the computer status diagnosis chip and the computer status diagnosis system including the same can perform authentication by the security unit connected with the smart device, so as to improve the usage security of the computer system.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
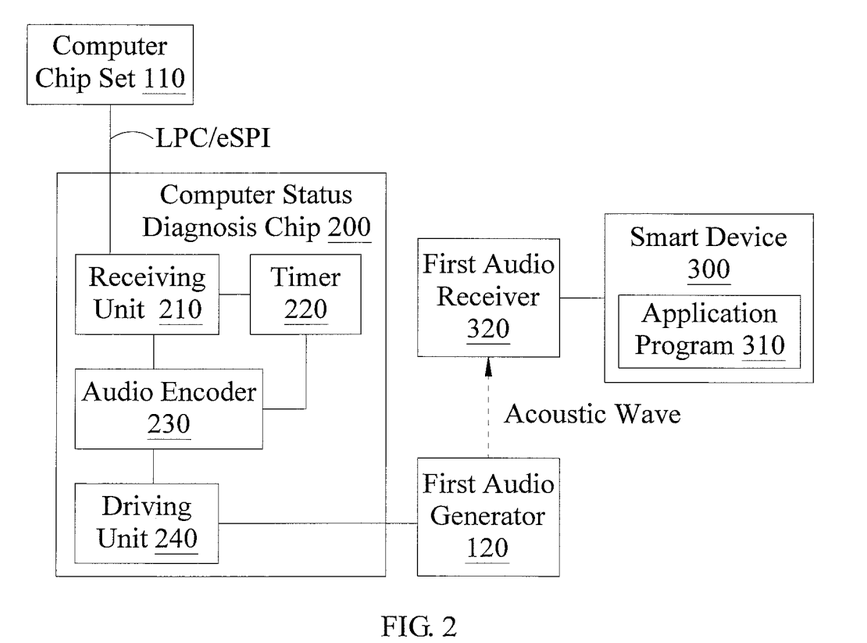
FIG. 2 is a block diagram of a first embodiment of a computer status diagnosis system of the present disclosure.

Please refer to FIG. 2 which shows a block diagram of a first embodiment of a computer status diagnosis system of the present disclosure. The computer status diagnosis system includes a computer status diagnosis chip 200, a first audio generator 120, a smart device 300 and a first audio receiver 320. The computer status diagnosis chip 200 includes a receiving unit 210 connected with a computer chip set 110, an audio encoder 230 connected with the receiving unit 210 and a driving unit 240 connected with the audio encoder 230. The first audio generator 120 is connected with the driving unit 240. The smart device 300 is installed with an application program 310. The first audio receiver 320 is connected with the smart device 300. The receiving unit 210 is configured to receive a detection signal from the computer chip set 110, and the audio encoder 230 encodes the detection signal into a first audio signal. The driving unit 240 is configured to drive the first audio generator 120 according to the first audio signal. The first audio generator 120 is configured to transmit the first audio signal to the first audio receiver 320 by acoustic wave. The smart device 300 receives the first audio signal through the first audio receiver 320, and then decodes the first audio signal by the application program 310 to obtain the detection signal, so as to display a computer status corresponding to the detection signal.

Preferably, the first audio generator 120 can be a loudspeaker of a computer to be detected, or a sounding device (such as a buzzer) extra disposed for this diagnosis system. Preferably, the smart device 300 can be a smartphone, a tablet computer and so on. The first audio receiver 320 can be a microphone built in the smart device 300. The receiving unit 210 can be a circuit inside the computer status diagnosis chip 200 for receiving an external signal. The circuit can be embedded with firmware of relevant connection protocol in advance. The driving unit 240 can be a driving circuit disposed inside the computer status diagnosis chip 200 for driving the first audio generator 120, and can also include an amplifier circuit for amplifying the received first audio signal. The computer chip set 110 can be an assembly of major components of the computer; for example, the computer chip set 110 may include a central processor, a south-bridge chip and DRAM. Hereinafter, the first audio signal is generated by encoding of the audio encoder 230, and according to the first audio signal the driving unit 240 drives the first audio generator 120 to output signal with corresponding acoustic wave.

More specifically, in response to an external detection instruction, the computer chip set 110 starts to perform a series of detections in sequential order to check whether the components of the computer are normal functioning. The detection instruction is not limited to POST of the BIOS, and a portion of the detection instruction can also be stored in the firmware of the computer status diagnosis chip 200 of the present disclosure. The computer chip set 110 outputs the detection signal according to the detection result in a pre-determined detection order. In current computer specification, the detection data is broadcasted on data bus by an IO address "0x80h". In the embodiment, the receiving unit 210 of the computer status diagnosis chip 200 receives the detection signal from the computer chip set 110, and then transmits the detection signal to the audio encoder 230. Upon receipt of the detection signal, the audio encoder 230 encodes the detection signal into the first audio signal according to a pre-determined condition and transmits the first audio signal to the driving unit 240. The first audio signal is recognizable for the first audio generator 120. The driving unit 240 drives the first audio generator 120 according to the first audio signal, to enable the first audio generator 120 to generate acoustic wave corresponding to the first audio signal. At this time, the smart device 300 can receive the acoustic wave through the first audio receiver 320 to obtain the first audio signal. The application program 310 is installed in the smart device 300 in advance, and has a decoding program corresponding to the encoding of the audio encoder 230 and a rendering program for rendering the detection signal into a message which is understandable for the user, and the message is displayed on screen of the smart device 300. Therefore, by using the smart device 300 installed with the application program 310 corresponding to the computer status diagnosis chip 200, the user can view the content displayed by the application program 310 to obtain a series of computer detection messages while the computer is booted-up. For example, the application program 310 can display the message "DRAM detection fails at X:X" or "Display card is activated normally at O:O", so that the user can quickly and directly obtain the current status of the computer by the computer status diagnosis system of the embodiment of the present disclosure without extra reading the BIOS specification of the manufacturer. By acoustic wave, the computer status diagnosis chip 200 transmits the signal to the smart device 300 carried by the user, so it is not necessary for the user to open the housing of the computer for obtaining the detection result of the computer. In addition, the computer status diagnosis system of the embodiment of the present disclosure can display the detection message without using a screen of the computer to be detected, so the user can obtain the current status of the computer even if the screen or the display card of the computer is malfunctioned.

Please refer back to FIG. 1. The receiving unit 210 can be connected to the computer chip set 110 through low pin count (LPC) interface or enhanced serial peripheral interface (eSPI). After the computer status diagnosis chip 200 and the computer chip set 110 are supplied with power to operate, the computer status diagnosis chip 200 starts to monitor the computer chip set 110 before the computer chip set 110 activates the BIOS.

More specifically, in current main circuit design of computer, the south-bridge chip or other chip still has a LPC interface, but the LPC interface is possibly substituted by the eSPI. Please refer back to FIG. 1. The computer status diagnosis chip 200 of the embodiment of the present disclosure can be disposed at a location of the system-on-chip (SoC) 50 shown in FIG. 1 and can provide function the same as the SoC 50, so that the layouts of other components are not affected. The computer status diagnosis chip 200 of the embodiment of the present disclosure can be connected with the LPC or eSPI of the computer chip set 110 through the receiving unit 210, so that the computer status diagnosis chip 200 and the computer chip set 110 can be supported with power by the computer system at almost the same time. Upon receipt of the power, the computer status diagnosis chip 200 starts to monitor the signal from the computer chip set 110, so as to prevent from missing any detection signal from the computer chip set 110. The computer status diagnosis chip 200 and the computer chip set 110 are directly connected with each other by the LPC or the eSPI without any intermediate component, so even if the central processor, the chip set, the screen or other component of the computer is abnormal, the computer detection system of the embodiment of the present disclosure can still operate independently to report the current detection status to the user.

Figure 3:
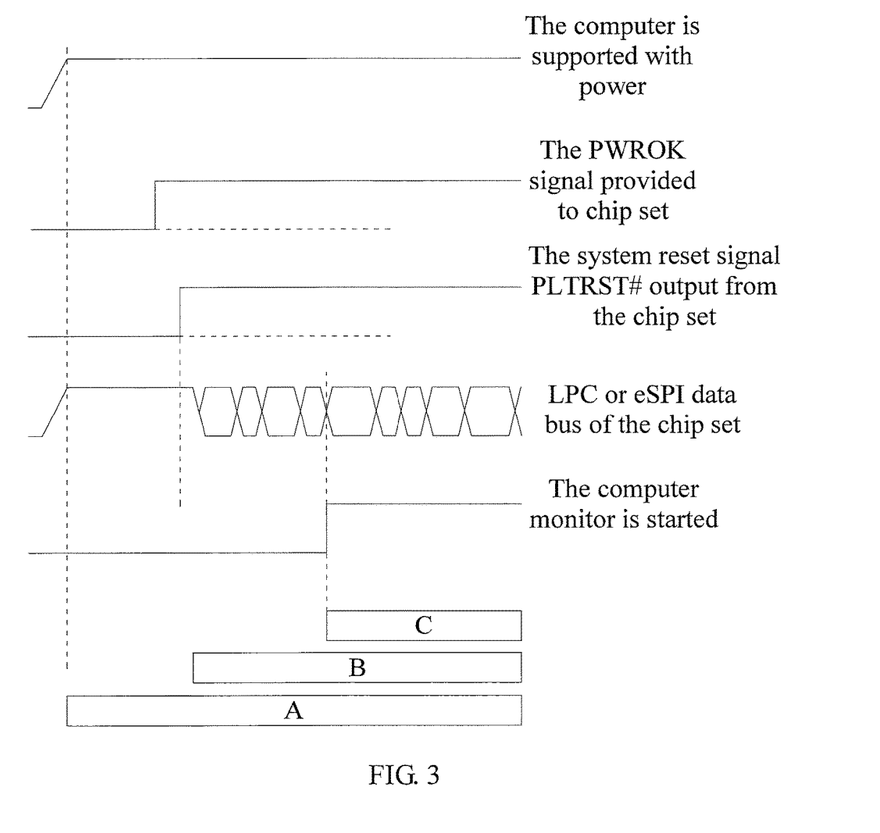
FIG. 3 illustrates timing diagram of execution time of steps of booting up the computer and a timing diagram of monitor time of the embodiment of the present disclosure and the conventional computer status diagnosis method.

The difference between the computer status diagnosis system of the embodiment of the present disclosure and the existing technology will be described more clearly below. Please refer to FIG. 3 which illustrates execution time of steps of booting up the computer and a timing diagram of monitor time of the embodiment of the present disclosure and the conventional computer status diagnosis method. In FIG. 3, the transition of the signal indicates a time point of occurrence of an event, for example, from low to high. The period A is a valid time in which the user can obtain the detection result provided by the computer detection system of the embodiment of the present disclosure. The period B is a valid time in which the user can obtain the detection result provided by the existing technology solution applying buzzer, LED light or a detection chip disposed on the motherboard. The period C is a valid time in which the user can obtain the detection result provided by the existing technology solution using the computer display to show the detection result.

As shown in FIG. 3, when the computer is supported with power (that is, the computer is booted up), the computer detection system of the embodiment of the present disclosure can almost immediately start to monitor the computer status and then provide the monitoring result to the user. In contrast, in the technology solution applying buzzer, LED light or the detection chip disposed on the motherboard, the user cannot obtain any meaningful detection message until the LPC or eSPI data bus is started to operate. Moreover, in the technology solution using the computer display to show the detection result, the user cannot obtain any meaningful detection message until the display card and the computer monitor are started to operate. Compared with the existing technology solutions of diagnosing the computer status, the computer detection system of the embodiment of the present disclosure does not miss any detection signal from the computer chip set and can transmit the detection signal instantly to the outside by acoustic wave.

Please refer back to FIG. 2. The computer status diagnosis chip 200 may further include a timer 220 electrically connected with the receiving unit 210 and the audio encoder 230. Under a condition that the computer chip set 110 and the computer status diagnosis chip 200 are supplied with power to operate, the timer 220 starts to count. After the timer 220 counts for a predetermined period but the computer chip set 110 does not transmit the detection signal to the computer status diagnosis chip 200 yet, the audio encoder 230 generates a first audio signal indicative of serious error, and the driving unit 240 drives the first audio generator 120 according to the first audio signal indicative of the serious error. When the first audio receiver 320 of the smart device 300 receives the first audio signal, the smart device 300 decodes the first audio signal and then displays a computer status corresponding to the serious error.

More specifically, after receiving power from the power supply, the computer chip set 110 starts to operate and output the detection signal. The computer detection system of the embodiment of the present disclosure can monitor some detection signals, such as PWROK signal required by the chip set or system reset signal PLTRST# output from the chip set, are output before the computer chip set activates the BIOS. If above-mentioned detection signals are not detected after the computer is booted up for a period, it is determined that the computer system possibly has serious error during boot-up process. In order to respond the event and notice the user, the computer status diagnosis chip 200 can further include the timer 220. After the computer status diagnosis chip 200 is supplied with power, the timer 220 starts to count. If the receiving unit 210 does not receive any signal from the computer chip set 110 yet after the timer 220 counts for a predetermined period (such as 3, 5, 7 or 10 seconds), the computer status diagnosis chip 200 determines that the computer chip set 110 has the serious error, and then triggers the audio encoder 230 to generate the first audio signal including a serious error message. The way of transmitting the first audio signal to the smart device 300 has been described in above content, so its detailed description is omitted. Upon receipt of the first audio signal, the application program 310 of the smart device 300 decodes the first audio signal to display the content related to the serious error message on the smart device 300, so that the user can obtain the serious error possibly occurred in the computer and then check the components (such as the CPU) according to the error message. Therefore, through the smart device 300 the user can know the serious error events, for example, the PWROK signal is not input to the computer chip set 110 or the chip set does not output the system reset signal.

After the computer chip set 110 transmits an initial detection signal to the receiving unit 210, the timer 220 is reset and started to count every time the computer chip set 110 transmits the detection signal to the receiving unit 210. Under a condition that the computer chip set 110 transmits the initial detection signal to the receiving unit 210, if the computer chip set 110 does not transmit next detection signal to the receiving unit 200 after the timer 220 re-counts for the predetermined period, the audio encoder 230 generates the first audio signal indicative of the component error message corresponding to the next detection signal, and the driving unit 240 drives the first audio generator 120 according to the first audio signal indicative of the component error message. After receiving the first audio signal through the first audio receiver 320, the smart device 300 decodes the first audio signal to display the computer status corresponding to the component error message thereon.

While executing the system detection for the POST, the central processor of the computer chip set 110 executes a series of instructions to check the statuses of components of the computer in sequential order. The sequential order for checking the components is fixed, so the component corresponding to the next detection signal can be determined according to the sequential order after the computer chip set 110 outputs the detection signal. If the computer chip set 110 does not output next detection signal for a period after the previous detection signal, it indicates malfunction of the component corresponding to the next detection signal. Like the process for the serious error message, the computer status diagnosis chip 200 determines that one of the components of the computer chip set 110 has error, and triggers the audio encoder 230 to generate the first audio signal including the component error message. The way of transmitting the first audio signal to the smart device 300 has been described in above content, so the detailed description is omitted. The application program 310 of the smart device 300 decodes the first audio signal and the smart device 300 displays the content related to the component error message, so that the user can know which component inside the computer possibly has error.

Figure 4A:
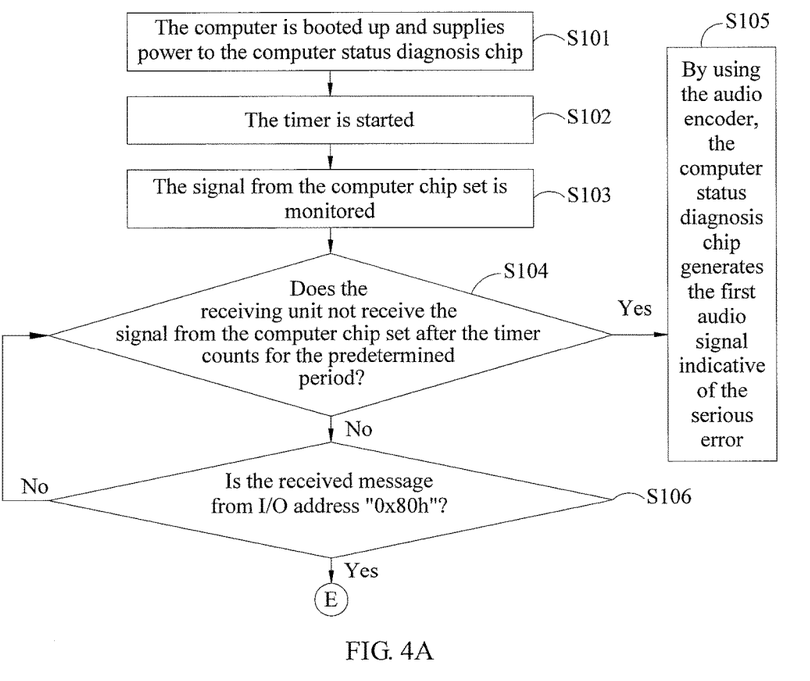
FIGS. 4A and 4B are flowcharts of the computer status diagnosis of operating the computer status diagnosis system of FIG. 2.
Figure 4B:
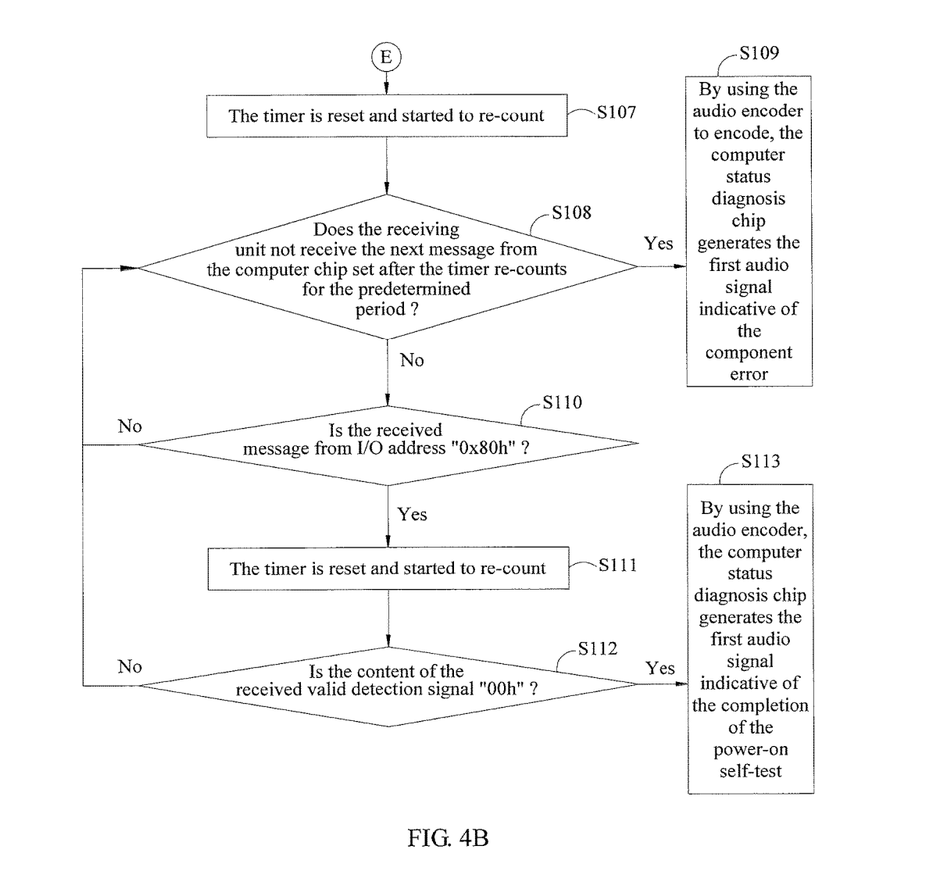

Please refer to FIGS. 4A and 4B which show a flowchart of a computer status diagnosis method of the present disclosure. The method is applied to the computer status diagnosis system shown in FIG. 2, and aforesaid process can also be integrated in flow shown in FIGS. 4A and 4B. Please refer to FIG. 4A first. In step S101, the computer is booted up and supplied with power by a main power supply, and the computer chip set and the computer status diagnosis chip are supplied with power to operate. In step S102, the timer of the computer status diagnosis chip is started to count. In step S103, the computer status diagnosis chip starts to monitor the signal from the computer chip set. The steps S101 through S103 are executed in a short time period after the computer is booted up, so the step S103 can be executed before the computer chip set wakes up other detection component (such as BIOS). In step 104, if the receiving unit does not receive the signal from the computer chip set after the timer counts for the predetermined period, the computer status diagnosis chip proceeds step S105. In the step S105, by using the audio encoder, the computer status diagnosis chip generates the first audio signal indicative of the serious error and triggers the driving unit to drive the first audio generator according to the first audio signal. Accordingly, the first audio generator outputs the audio signal including the message indicative of the serious error. If the receiving unit receives the message from the computer chip set after the timer counts for the predetermined period, the computer status diagnosis chip proceeds step S106. Next, please refer to FIG. 4B. FIGS. 4A and 4B are connected at point E. In step S106, the computer status diagnosis chip checks whether the received message is a message from I/O address "0x80h" which is an address for the computer system to output a status message. If the received message is from the I/O address "0x80h", it indicates that this message is a valid detection message, and the computer chip set normally executes the detection task, and the computer status diagnosis chip proceeds step S107. If the received message is not from the I/O address "0x80h", it indicates that the message is not a valid detection message, the computer status diagnosis chip still keeps waiting for the valid detection signal transmitted from the computer chip set and returns to the step S104, and the timer is kept counting and not reset. In step S107, the timer is reset and started to re-count. In step S108, if the receiving unit does not receive the next message from the computer chip set after the timer re-counts for the predetermined period, the computer status diagnosis chip proceeds step S109. In the step S109, by using the audio encoder to encode, the computer status diagnosis chip generates the first audio signal indicative of the component error. The component described in the component error is the component corresponding to the next detection signal which should be received by the computer status diagnosis chip under the normal functioning of the computer chip set. Next, the computer status diagnosis chip triggers the driving unit to drive the first audio generator according to the first audio signal, and the first audio generator then outputs the audio signal containing the message indicative of the component error. If the receiving unit receives the next message from the computer chip set after the timer re-counts for the predetermined period, the computer status diagnosis chip proceeds step S110. In the step S110, the computer status diagnosis chip checks whether the received message is from I/O address "0x80h". If the received message is from I/O address "0x80h", the timer is reset and started to count; if the received message is not from I/O address "0x80h", the computer status diagnosis chip keeps waiting for the next detection signal from the computer chip set and then executes the step S108. The timer is kept counting and not reset. After the step S111, the computer status diagnosis chip checks whether the content of the received valid detection signal is "00h", if yes, it indicates that the power-on self-test (POST) is done successfully, and the computer status diagnosis chip proceeds step S112. If the content of the received valid detection signal is not "00h", the computer status diagnosis chip keeps waiting for the next detection signal from the computer chip set and returns to step S108. In the step S113, by using the audio encoder, the computer status diagnosis chip generates the first audio signal indicative of the completion of the power-on self-test.

Figure 5:
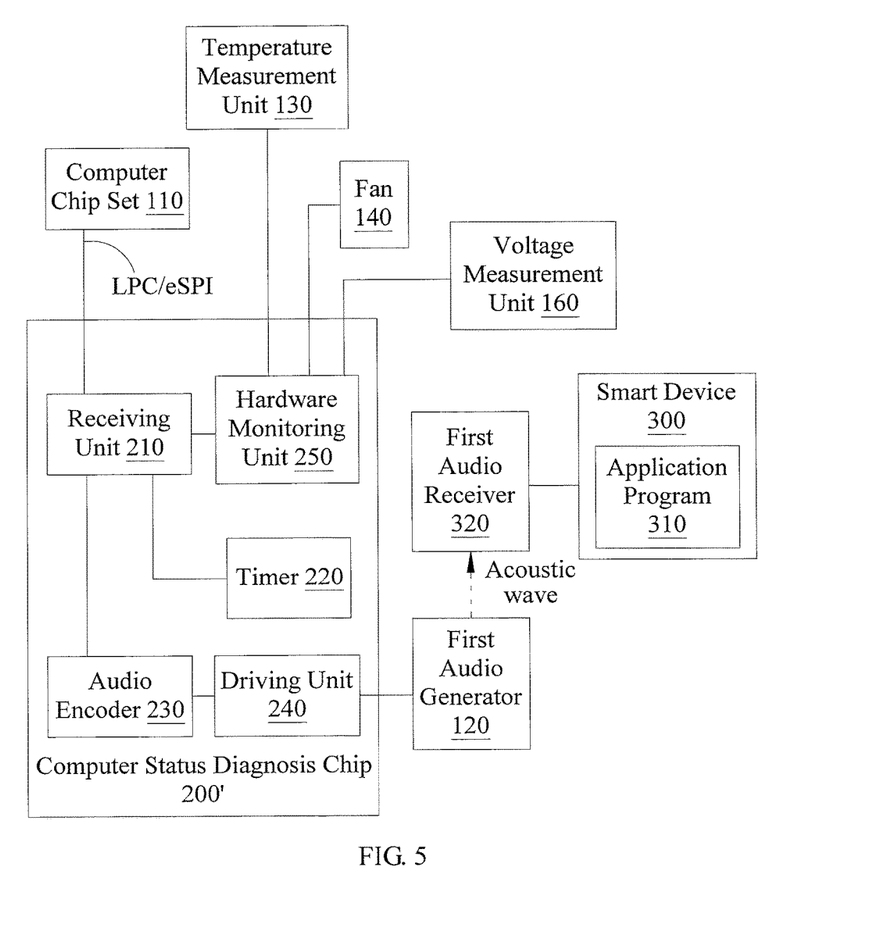
FIG. 5 is a block diagram of a second embodiment of the computer status diagnosis system of the present disclosure.

Please refer to FIG. 5 which shows a block diagram of a second embodiment of the computer status diagnosis system of the present disclosure. In the second embodiment, the receiving unit 210 of the computer status diagnosis chip 200' is further connected with several signal sources which outputs an analog signal or a digital signal. The audio encoder 230 encodes the analog signal or the digital signal into the first audio signal. The driving unit 240 drives the first audio generator 120 according to the first audio signal which is encoded based on the analog signal or the digital signal. After the first audio receiver 320 of the smart device 300 receives the first audio signal, the smart device 300 decodes the first audio signal and displays the message related to the analog signal or the digital signal, and the driving unit then drives the first audio generator according to the first audio signal. The first audio generator outputs the audio signal.

Particularly, the signal sources may include a temperature measurement unit 130, a fan 140 or a voltage measurement unit 160. The temperature measurement unit 130 can provide the analog signal or the digital signal containing temperature value of central processor or motherboard. The fan 140 can provide the digital signal containing a fan speed value. The voltage measurement unit 160 can provide the analog signal containing working voltage values of other components of the computer. In the second embodiment, apart from displaying the working states of the components of the computer, on the smart device 300 the computer status diagnosis system can also display the working environment inside the computer, to facilitate the user to do overall consideration in the working state of the computer. It should be noted that the computer status diagnosis chip 200' and the signal source can be directly connected with each other without other intermediate component or circuit inside the computer, so that the computer status diagnosis chip 200' can be operated independently to report the statuses of the signal sources even if the component inside the computer has error. For example, when the smart device 300 displays that the central processor of the computer system has error and the temperature near or of the central processor is excessively high, the user can determine that the malfunction of the central processor is caused by the excessively-high temperature and then perform corresponding action to solve the malfunction.

Figure 6:
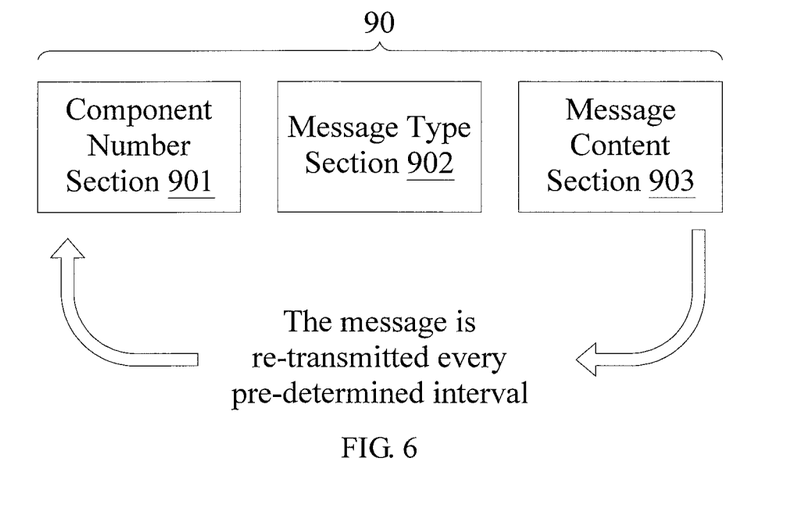
FIG. 6 is a schematic view of an embodiment of the first audio signal of the present disclosure.

Please refer to FIG. 6 which shows a schematic view of an embodiment of the first audio signal 90 of the present disclosure. Every time the audio encoder 230 generates the first audio signal 90 by encoding, the first audio signal 90 may include a component number section 901, a message type section 902 and a message content section 903.

When multiple computer hosts perform the status diagnosis and system test concurrently, the audio encoder 230 can write ID of the computer system of individual computer host in the component ID section 901 during encoding for forming the first audio signal 90. When displaying the content containing in the first audio signal, the display device 300 concurrently displays the ID of the tested computer system to facilitate the user to quickly determine which computer host transmits the first audio signal. Preferably, the computer status diagnosis chip 200' can determine the ID of the computer system according to a pin voltage of the computer status diagnosis chip 200' when being supplied with power. The first audio signal 90 further includes the message type section 902 and the message content section 903. The message type section 902 includes information about the item to be tested or detected, and the message content section 903 includes the test or detection result of the item. For example, when the first audio signal 90 is a detection signal transmitted from the computer chip set 110, the first audio signal 90 has content including "1234567890" (ID of the computer system) at section 901, "DRAM" (the item to be tested) at section 902, and "test failure" (test result) at section 903. When the audio signal 90 is the analog signal transmitted from the temperature measurement unit 130, the content of the first audio signal 90 includes "1245678930" (ID of the computer system) at section 901, "temperature of the motherboard" (the item to be detected) at section 902, and "40° C." (the detection result) at section 903. When the message content section 903 of the first audio signal 90 includes the result indicative of a malfunction or abnormal event, the computer status diagnosis chip can control the driving unit to drive the audio generator to repeatedly output the first audio signal 90 at a predetermined interval (such as 1, 2, or 3 seconds), so as to facilitate the user to notice and find the broken computer. Preferably, the warning action is not stopped until the computer is turned off or the malfunction or abnormal event is solved. In some embodiments, the component ID section 901 is optional. For example, when the computer status diagnosis system is applied to single computer, the first audio signal 90 can be encoded without the component ID section 901, so as to simplify the detection process and reduce the length of the first audio signal 90.

Please refer back to FIG. 5. The computer status diagnosis chip 200' can further include a hardware monitoring unit 250 which is electrically connected to the receiving unit 210, the temperature measurement unit 130, the fan 140 and the voltage measurement unit 160, and configured to convert the received analog signal into the digital signal, and then output the digital signal to the computer chip set 110 through the receiving unit 210.

After receiving the analog signal, the computer status diagnosis chip 200' transmits the message carried in the analog signal to the smart device 300 for display and also transmits the converted digital signal to the computer chip set 110. Therefore, the computer chip set 110 can obtain the messages detected by the analog signal sources. After the power-on self-test is completed and the computer is booted up successfully, the hardware monitoring unit 250 can be kept converting the received analog signal into the digital signal which is then output to the computer chip set 110 through the receiving unit 210, so as to enable the computer chip set 110 to instantly obtain variation of the messages detected by the analog signal sources and display the messages. For example, after the computer is booted up successfully and starts to run operating system, according to the signal from the hardware monitoring unit 250 the computer chip set 110 can display the voltages, fan speeds and temperatures of the major components of the computer system in an application program of the operating system.

Figure 7:
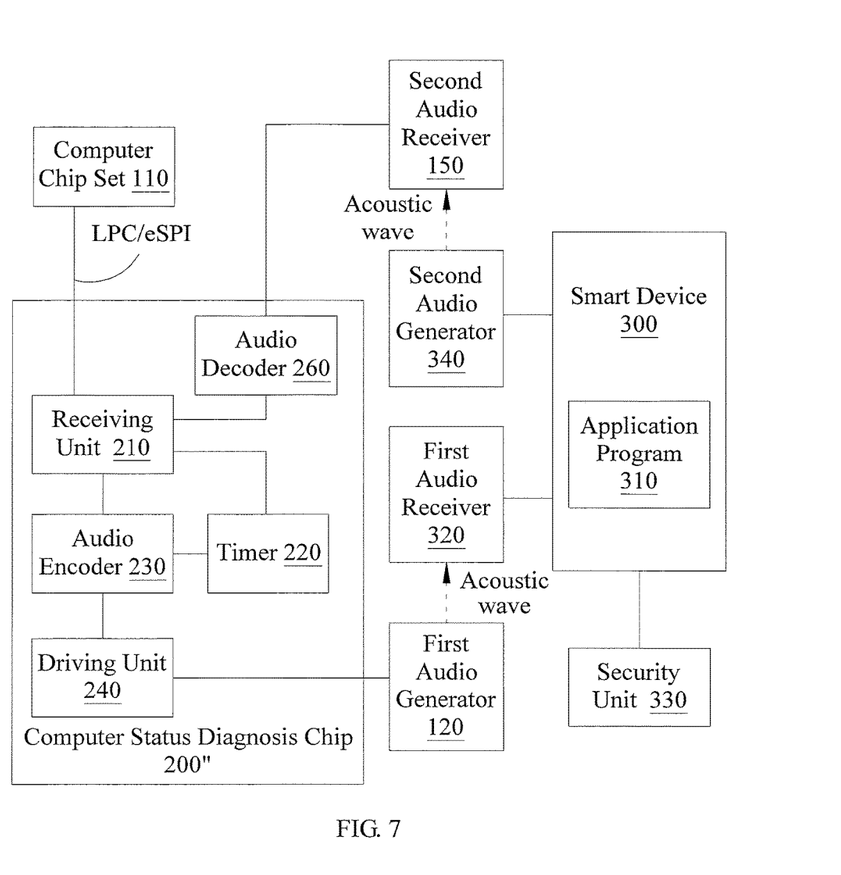
FIG. 7 is a block diagram of a third embodiment of the computer status diagnosis system of the present disclosure.

Please refer to FIG. 7 which shows a block diagram of a third embodiment of the computer status diagnosis system of the present disclosure. The receiving unit 210 of the computer status diagnosis chip 200" is further connected with the second audio receiver 150, and the smart device 300 is further connected with the second audio generator 340. The smart device 300 encodes a control instruction as a second audio signal, and drives the second audio generator 340 according to the second audio signal. The second audio generator 340 is configured to transmit the second audio signal to the second audio receiver 150 by acoustic wave. The receiving unit 210 receives the second audio signal through the second audio receiver 150. The audio decoder 260 of the computer status diagnosis chip 200" decodes the second audio signal to obtain the control instruction, and the computer status diagnosis chip 200" executes the corresponding action according to the control instruction.

More specifically, the second audio receiver 150 can be a microphone built in the computer or an external microphone, and the second audio generator 340 can be a speaker built in the smart device 300 or an external loudspeaker. In the third embodiment, the user can transmit the control instruction by using the smart device 300, that is, the control instruction is transmitted to the computer status diagnosis chip 200" through acoustic wave transmission between the second audio generator 340 and the second audio receiver 150. In other words, the smart device 300 can be used to remotely control the computer status diagnosis chip 200" and the computer system by sound transmission. The control instruction can include a boot command, an operating system login instruction, an application program login or decryption instruction, and so on. The second audio signal is defined as a signal generated by the smart device 300 for driving the second audio generator 340 to output corresponding acoustic wave.

Please refer back to FIG. 7. The smart device 300 can further be connected to a security unit 330, and encode an authentication signal into the second audio signal. The authentication signal is from the security unit 330.

In order to improve the usage security of the computer, the smart device 300 performs the authentication in advance during remote control. Preferably, the security unit 330 can be a SIM card of the smart device 300. Before encoding the control instruction to generate the second audio signal, the smart device 300 requests SIM card to provide the authentication signal including personal ID data. Next, the smart device 300 encodes the authentication signal into the second audio signal. Therefore, the computer status diagnosis chip 200" can decode the second audio signal to obtain the control instruction and the authentication signal. The computer status diagnosis chip 200" can compare the personal ID data contained in the authentication signal with data stored in the memory for confirmation, and then execute the action requested by the control instruction after the confirmation. In other embodiment, the security unit 330 can be a fingerprint capture device. Before encoding the control instruction into the second audio signal, the smart device 300 triggers the fingerprint capture device to request the user for input of authentication signal (that is, the user's fingerprint) and then encodes the authentication data into the second audio signal. After decoding the second audio signal, the computer status diagnosis chip 200" obtains the control instruction and the authentication signal, and then compares the fingerprint data contained in the authentication signal with the data stored in the memory for confirmation. The computer status diagnosis chip 200" then executes the action requested by the control instruction after the fingerprint data is confirmed to be matched with the data stored in the memory. In addition, after checking the authentication data, the computer status diagnosis chip 200" may transmit a message of confirmation being successful or failed to the smart device 300. The computer status diagnosis chip 200" encodes the message of successful or failed confirmation as the first audio signal by the audio encoder 230. By acoustic wave transmission between the first audio generator 120 and the first audio receiver 320 and the decoding process of the application program 310, in the smart device 300 the user can obtain the result after transmitting the control instruction.

Preferably, the acoustic wave, which is generated by the first audio generator 120 according to the first audio signal, has frequency in a range from 15 kHz to 20 kHz.

In order to prevent the sound output by the first audio generator 120 from bothering the user, the acoustic wave, which is generated by the first audio generator 120 according to the first audio signal, has frequency in the range from 15 kHz to 20 kHz. Therefore, it is hard for the user to hear the acoustic wave generated by the first audio generator 120 in the embodiment of the present disclosure. The acoustic wave with the frequency ranged from 15 kHz to 20 kHz can be received by a standard microphone for further recognition, so the computer status diagnosis system of the embodiment of the present disclosure can continuously transmit the audio signal which is generated according to the diagnosis of the computer status.

In the embodiment of the present disclosure, the computer status diagnosis chip and the computer status diagnosis system including the same, in accordance with the present disclosure, have at least one advantage described below:

First, the computer status diagnosis chip and the computer status diagnosis system including the same can encode the detection signal as an audio signal which is then transmitted to the smart device and decoded by the application program of the smart device, so that the user can directly obtain the computer status on the smart device.

Secondly, the computer status diagnosis chip is connected to the computer chip set through LPC or eSPI, so that the computer status can be monitored instantly after the computer is booted up to prevent information missing.

Thirdly, the computer status diagnosis chip and the computer status diagnosis system including the same can transmit signal by acoustic wave, so as to save power consumption.

Fourthly, the computer status diagnosis chip and the computer status diagnosis system including the same can receive and decode the audio signal from the smart device, so as to achieve the function of remotely operating the computer.

Fifthly, the computer status diagnosis chip and the computer status diagnosis system including the same can perform authentication by the security unit connected with the smart device, so as to improve the usage security of the computer system.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A computer status diagnosis chip, connected to a computer chip set and a first audio generator, and configured to display a computer status on a smart device, the computer status diagnosis chip comprising:
    a signal receiver configured to receive a detection signal from the computer chip set;
    an audio encoder connected to the signal receiver and configured to encode the detection signal into a first audio signal;
    an audio generator driver configured to drive the first audio generator according to the first audio signal; and
    a timer connected to the signal receiver and the audio encoder,
    wherein the first audio generator transmits the first audio signal by acoustic wave to a first audio receiver connected with the smart device, and after the smart device receives the first audio signal through the first audio receiver, the smart device decodes the first audio signal by an application program of the smart device to obtain the detection signal, and displays the computer status corresponding to the detection signal, and
    wherein after the computer status diagnosis chip and the computer chip set are supplied with power by a computer system, the computer status diagnosis chip starts to monitor the computer chip set before the computer chip set activates BIOS, and if the computer chip set does not transmit the detection signal to the computer status diagnosis chip after the timer counts for a predetermined period, the audio encoder generates the first audio signal indicative of a serious error message and the audio generator driver drives the first audio generator according to the first audio signal indicative of the serious error message.

2. The computer status diagnosis chip according to claim 1, wherein the signal receiver is connected with the computer chip set through low pin count interface or enhanced serial peripheral interface.

3. The computer status diagnosis chip according to claim 2, further comprising:
wherein after the smart device receives the first audio signal through the first audio receiver, the smart device decodes the first audio signal and displays the computer status corresponding to the serious error message.

4. The computer status diagnosis chip according to claim 3, wherein after the computer chip set transmits an initial detection signal to the signal receiver, the timer is reset and started to re-count every time the computer chip set transmits the detection signal to the signal receiver;
under a condition that the computer chip set transmits the initial detection signal to the signal receiver, if the computer chip set does not transmit a next detection signal or an end message to the signal receiver after the timer re-counts for the predetermined period, the audio encoder generates the first audio signal indicative of a component error message corresponding to the next detection signal, and the audio generator driver drives the first audio generator according to the first audio signal indicative of the component error message;
wherein after the smart device receives the first audio signal through the first audio receiver, the smart device decodes the first audio signal and displays the computer status corresponding to the component error message.

5. The computer status diagnosis chip according to claim 1, wherein the signal receiver is further connected to a signal source which outputs an analog signal or a digital signal, the audio encoder encodes the analog signal or the digital signal into the first audio signal, and the audio generator driver drives the first audio generator according to the first audio signal encoded based on the analog signal or the digital signal;
wherein after the smart device receives the first audio signal through the first audio receiver, the smart device decodes the first audio signal and displays a message related to the analog signal or the digital signal.

6. The computer status diagnosis chip according to claim 5, further comprising:
a hardware monitor connected to the signal receiver, and connected to a temperature measurement unit, a fan or a voltage measurement unit, and the hardware monitor configured to convert the received analog signal into the digital signal and then output the converted digital signal to the computer chip set.

7. The computer status diagnosis chip according to claim 1, wherein the signal receiver is further connected to a second audio receiver, and the smart device is further connected to a second audio generator;
wherein the smart device encodes a control instruction as a second audio signal, and drives the second audio generator according to the second audio signal, and the second audio generator transmits the second audio signal to the second audio receiver by acoustic wave;
wherein the signal receiver receives the second audio signal through the second audio receiver, and the signal receiver decodes the second audio signal by an audio decoder to obtain the control instruction, and executes an action corresponding to the control instruction.

8. A computer status diagnosis system, comprising:
a computer status diagnosis chip comprising a signal receiver, an audio encoder an audio generator driver and a timer, the signal receiver connected to a computer chip set, the audio encoder connected to the signal receiver, the audio generator driver connected to the audio encoder, and the timer connected to the signal receiver and the audio encoder;
a first audio generator connected the audio generator driver;
a smart device installed with an application program;
a first audio receiver connected to the smart device;
wherein the signal receiver is configured to receives a detection signal from the computer chip set, the audio encoder is configured to encode the detection signal into a first audio signal, and the audio generator driver is configured to drive the first audio generator according to the first audio signal, and the first audio generator is configured to transmit the first audio signal to the first audio receiver by acoustic wave, and after the smart device receives the first audio signal through the first audio receiver, the application program is configured to decode the first audio signal to obtain the detection signal, and the smart device displays a computer status corresponding to the detection signal, and
wherein after the computer status diagnosis chip and the computer chip set are supplied with power by a computer system, the computer status diagnosis chip starts to monitor the computer chip set before the computer chip set activates the BIOS, and if the computer chip set does not transmit the detection signal to the computer status diagnosis chip after the timer counts for a predetermined period, the audio encoder generates the first audio signal indicative of a serious error message and the driving unit audio generator driver drives the first audio generator according to the first audio signal indicative of the serious error message.

9. The computer status diagnosis system according to claim 8, wherein the signal receiver is connected with the computer chip set through low pin count interface or enhanced serial peripheral interface.

10. The computer status diagnosis system according to claim 9,
wherein after the smart device receives the first audio signal through the first audio receiver, the smart device decodes the first audio signal and displays the computer status corresponding to the serious error message.

11. The computer status diagnosis system according to claim 10, wherein after the computer chip set transmits an initial detection signal to the signal receiver, the timer is reset and started to re-count every time the computer chip set transmits the detection signal to the signal receiver;
wherein under a condition that the computer chip set transmits the initial detection signal to the signal receiver, if the computer chip set does not transmit a next detection signal or an end message to the signal receiver after the timer re-counts for the predetermined period, the audio encoder generates the first audio signal indicative of a component error message corresponding to the next detection signal, and the audio generator driver drives the first audio generator according to the first audio signal indicative of the component error message;

wherein after the smart device receives the first audio signal through the first audio receiver, the smart device decodes the first audio signal and displays the computer status corresponding to the component error message.

12. The computer status diagnosis system according to claim 8, wherein the signal receiver is further connected to a signal source which outputs an analog signal or a digital signal, the audio encoder encodes the analog signal or the digital signal into the first audio signal, and the audio generator driver drives the first audio generator according to the first audio signal encoded based on the analog signal or the digital signal;

wherein after the smart device receives the first audio signal through the first audio receiver, the smart device decodes the first audio signal and display a message related to the analog signal or the digital signal.

13. The computer status diagnosis system according to claim 12, wherein the first audio signal, which is generated by the audio encoder, comprises an ID section, a message type section and a message content section.

14. The computer status diagnosis system according to claim 8, further comprising:

a second audio generator connected to the smart device; and a second audio receiver connected to the signal receiver;

wherein the smart device encodes a control instruction as a second audio signal, and according to the second audio signal drives the second audio generator to transmit the second audio signal to the second audio receiver by acoustic wave, and the signal receiver receives the second audio signal through the second audio receiver; and wherein the signal receiver decodes the second audio signal by an audio decoder to obtain the control instruction, and executes an action corresponding to the control instruction.

\* \* \* \* \*